(12) United States Patent
Delbecq

(10) Patent No.: US 9,094,084 B2
(45) Date of Patent: Jul. 28, 2015

(54) DETECTOR AND METHOD FOR DETECTING AN OSCILLATORY SIGNAL AMONG NOISE

(75) Inventor: Dominique Delbecq, Frouzins (FR)

(73) Assignee: Freescale Semiconductor, Inc., Austin, TX (US)

(*) Notice: Subject to any disclaimer, the term of this patent is extended or adjusted under 35 U.S.C. 154(b) by 344 days.

(21) Appl. No.: 13/578,276

(22) PCT Filed: Feb. 16, 2010

(86) PCT No.: PCT/IB2010/000617
§ 371 (c)(1),
(2), (4) Date: Aug. 10, 2012

(87) PCT Pub. No.: WO2011/101697
PCT Pub. Date: Aug. 25, 2011

(65) Prior Publication Data
US 2012/0307877 A1    Dec. 6, 2012

(51) Int. Cl.
*H04B 7/00* (2006.01)
*H04B 1/16* (2006.01)
(52) U.S. Cl.
CPC ........................................ *H04B 1/16* (2013.01)
(58) Field of Classification Search
CPC ............................................................ H04B 7/00
USPC ................................................ 375/320, 340
See application file for complete search history.

(56) References Cited

U.S. PATENT DOCUMENTS

| 3,934,207 | A | * | 1/1976 | Fischman et al. | ............. | 329/328 |
| 3,936,764 | A | * | 2/1976 | Fischman et al. | ............. | 329/328 |
| 5,111,479 | A |   | 5/1992 | Akazawa |   |   |
| 6,496,549 | B1 | * | 12/2002 | Crawford | ....................... | 375/320 |
| 8,699,388 | B2 | * | 4/2014 | Uno | ............... | 370/281 |
| 2002/0006097 | A1 | * | 1/2002 | Kim et al. | ................... | 369/59.18 |
| 2002/0070766 | A1 |   | 6/2002 | Therisod et al. |   |   |
| 2003/0198163 | A1 | * | 10/2003 | Kim et al. | .................. | 369/53.31 |

(Continued)

FOREIGN PATENT DOCUMENTS

| CN | 1946069 A | 4/2007 |
| JP | 4103230 A | 4/1992 |

(Continued)

OTHER PUBLICATIONS

International Search Report and Written Opinion correlating to PCT/IB2010/000617 dated Dec. 7, 2010.

*Primary Examiner* — Jaison Joseph

(57) ABSTRACT

A signal detector is configured to detect a signal of interest in a received signal. The received signal may comprise noise. The signal of interest is oscillatory at least during one or more time segments. The signal detector comprises a frequency discriminator arranged to determine an instantaneous frequency of the received signal, an evaluator arranged to determine an amount of change of the instantaneous frequency during a test interval, and a comparator arranged to determine whether the amount of change is below a given threshold. The signal of interest may be digitally modulated. In this case the test interval may be shorter than the duration of one data bit in the signal of interest. In a related aspect, a signal transmission system comprises a signal generator for generating a signal of interest and a signal detector for detecting the signal of interest in a received signal. A method of detecting a signal of interest in a received signal is also proposed.

20 Claims, 8 Drawing Sheets

(56) References Cited

U.S. PATENT DOCUMENTS

| | | |
|---|---|---|
| 2005/0257238 A1 | 11/2005 | Hooijmans |
| 2007/0268828 A1* | 11/2007 | Peng .............................. 370/235 |
| 2011/0121866 A1* | 5/2011 | Suzuki ........................... 327/105 |
| 2013/0215806 A1* | 8/2013 | Uno ............................... 370/281 |

FOREIGN PATENT DOCUMENTS

| | | |
|---|---|---|
| JP | 4216226 A | 8/1992 |
| JP | 2008085669 A | 4/2008 |
| KR | 10-0150762 B1 | 12/1998 |
| KR | 10-2000-0020319 A | 4/2000 |

* cited by examiner

DETECTOR AND METHOD FOR DETECTING AN OSCILLATORY SIGNAL AMONG NOISE

FIELD OF THE INVENTION

This invention relates to a signal detector for detecting a signal of interest in a received signal, wherein the signal of interest is oscillatory at least during one or more time segments.

This invention also relates to a device comprising such a signal detector.

The invention further relates to a signal transmission system comprising a signal generator for generating a signal of interest and a signal detector for detecting the signal of interest in a received signal.

This invention further relates to a method of detecting a signal of interest in a received signal.

BACKGROUND OF THE INVENTION

Oscillatory signals are generated for example in a receiver which receives a travelling wave such as sound or an electromagnetic wave, e.g. a radio wave, and produces an output, e.g. a voltage or current, in response to the instantaneous amplitude of the received wave. Conversely, an oscillatory signal may be generated on purpose in order to generate a corresponding wave to be emitted by e.g. a loudspeaker or an antenna.

A signal often has a well-defined oscillation frequency, also referred to as the carrier frequency. Information can be modulated onto such a signal (carrier signal or carrier) by modulating e.g. its amplitude (amplitude modulation, AM) or its frequency (frequency modulation, FM). The information modulated on the carrier signal may for example be an analogous audio signal or a digital bit stream. For example, using FM a succession of binary bits can be modulated onto the carrier by varying the carrier frequency between a first frequency F0 representing a logical ZERO (LOW) and a second frequency F1 representing a logical ONE (HIGH). Alternatively, using AM the carrier's amplitude may be varied between a first amplitude A0 representing the logical ZERO and a second amplitude A1 representing the logical ONE. Both A1 and A2 may be non-vanishing amplitudes. Alternatively, one of these amplitudes, e.g. A1, is non-vanishing while the other amplitude, e.g. A0, is zero. In this case, the carrier signal is a succession of pulses, each pulse having a constant frequency and constant amplitude. Each pulse thus represents a succession of one or more bits in the ONE state, while each gap between consecutive pulses represents a succession of one or more bits in the ZERO state.

Signal detectors are generally used to detect automatically a signal of interest in a received signal. The received signal may comprise undesired signals and noise instead or in addition to the signal of interest. Upon detecting that the signal of interest is present in the received signal, a specific action may be triggered, such as further processing the received signal, switching from a current carrier to a newly detected carrier, and/or energizing a device for processing the signal of interest. In a typical application, a receiver is periodically turned on to listen if another device attempts to communicate with it. Its turn-on time (T_ON) is often required to be as short as possible because it may directly define the energy consumption of the system as T_ON/T_OFF times the receivers power. In particular in short-range devices the energy consumption is often a key parameter and should be kept as low as possible.

Various methods for detecting a carrier signal are known in the art. For example, some receivers try to identify a specific key encoded in the received signal, or measure the received signal strength to provide a received signal strength indication (RSSI). The first option (identifying a specific key) usually requires a long turn-on time, whereas the second option (measuring the received signal strength) requires a high accuracy in the power measurement which in turn requires a tight receive gain control.

U.S. Pat. No. 5,111,479 describes a carrier sense circuit for sensing a carrier component of a received signal in a spread spectrum system. The circuit includes a multiplier which produces a squared signal by multiplying the received signal by itself, a filter, and a detecting circuit.

JP 2008/85669 discloses a carrier sensing circuit comprising a mixer for mixing a received radio frequency signal and a local signal, and a band-pass filter.

JP 04 216226 describes a received signal detector which determines a reception level, while JP 04 103230 presents a carrier sense circuit based on RSSI.

SUMMARY OF THE INVENTION

The present invention provides a signal detector, a device, and a method as described in the accompanying claims.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale. The same reference numerals are used throughout the figures to designate the same, equivalent or analogous components.

DETAILED DESCRIPTION OF THE PREFERRED EMBODIMENTS

Figure 1:
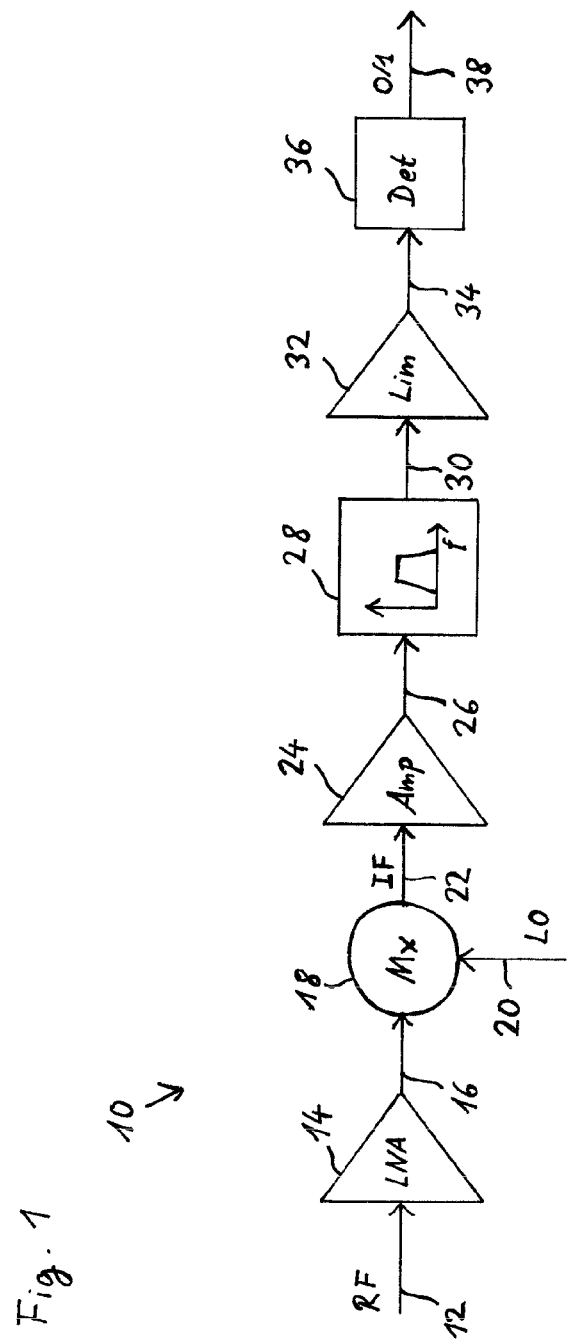
FIG. 1 schematically shows an example of an embodiment of a signal detector.

Schematically represented in FIG. 1 is a signal detector 10 for detecting a signal of interest in a received signal 12. The signal detector 10 may for example be a component of an integrated circuit, an electronic device, an optoelectronic device, a wireless communication device, a short-range device, a mobile phone, a radio receiver, a radio controlled device, a radio controlled clock or a sound detector. For example, the received signal 12 may be received from an antenna or from a sound detector, e.g. a microphone, in response to an incident electromagnetic or acoustic wave. The signal of interest possibly contained in the received signal 12 is assumed to be oscillatory at least during one or more time segments. For example, the signal of interest may oscillate in a sinusoidal fashion during each of the one or more time segments. For example, the signal of interest may be a continuous sinusoidal oscillation or a sequence of sinusoidal pulses or approximately sinusoidal pulses. Thus, the signal of interest may have a carrier frequency which is substantially constant (stable) during the one or more time segments.

In the example shown, the signal detector 10 is composed of a front-end stage 14, 18, 24, 28, 32, and a detection stage 36. In the example, the front-end stage 14, 18, 24, 28, 32 is a typical heterodyne radio-frequency (RF) receiver chain. It processes the received signal 12 to generate a processed received signal 34 which is fed to the detection stage 36. The detection stage 36 generates a detection signal 38 to indicate whether or not it detected the signal of interest in the received signal 34. In the present example, the detection signal 38 is a binary signal. If the detection stage 36 detects no signal of interest in the received signal 34, it outputs a first value. If the detection stage 36 however detects the signal of interest in the received signal 34, it outputs a second value. The first value and the second value may be represented for example by a first voltage level and a second voltage level, respectively. Another device or component (not shown) may be arranged to be energized in response to the signal detector 10 detecting the signal of interest. The signal detector 10 may be implemented digitally as well as analogously.

In the example shown, the receiver chain 14, 18, 24, 28, 32 comprises a low-noise amplifier 14, a mixer 18, an amplifier 24, a band-pass filter 28 and a limiter 32 which are coupled in series and operate as follows. The received signal 12, e.g. a broadband signal from an antenna, is amplified by the low-noise amplifier 14. The amplified signal 16 is down-converted or up-converted by mixing it with a local oscillator (LO) signal 20 in the mixer 18. The mixer 18 thus converts the signal of interest possibly contained in the received signal 12 to an intermediate frequency (IF) which is typically the sum or the difference of the original carrier frequency of the signal of interest and the frequency of the local oscillator. The up-converted of down-converted signal 22 is further amplified by the amplifier 24. The amplified signal 26 is filtered by the band-pass filter 28 to remove unwanted frequency components. The frequency of the local oscillator signal 20 and the transmission band of the band-pass filter 28 are chosen such that the signal of interest is allowed to pass the band-pass filter 28. The bandwidth of the band-pass filter may be chosen sufficiently large to allow information modulated on the signal of interest to pass the band-pass filter 28. This allows further exploiting the filtered signal 30 in addition to merely detecting the signal of interest. The band-filtered signal 30 is further processed by the limiter 32 which generates an output signal 34 that is limited in amplitude. It is noted that each of the various components 14, 18, 24, 28 and 32 of the receiver chain merely transforms the received signal 12 without adding or removing any information of interest to or from the signal. The output signals 16, 22, 26, 30 and 34 generated by the low-noise amplifier 14, the mixer 18, the amplifier 24, the band-pass filter 24 and the limiter 32, respectively, may therefore be considered representations of the received signal 12 and may, for the sake of simplicity, also be referred to as the "received signal" in this application.

In an alternative embodiment, the received signal 12 is processed differently before being fed to the detection stage 36. In another embodiment the received signal 12 is directly fed to the detection stage 36.

Figure 2:
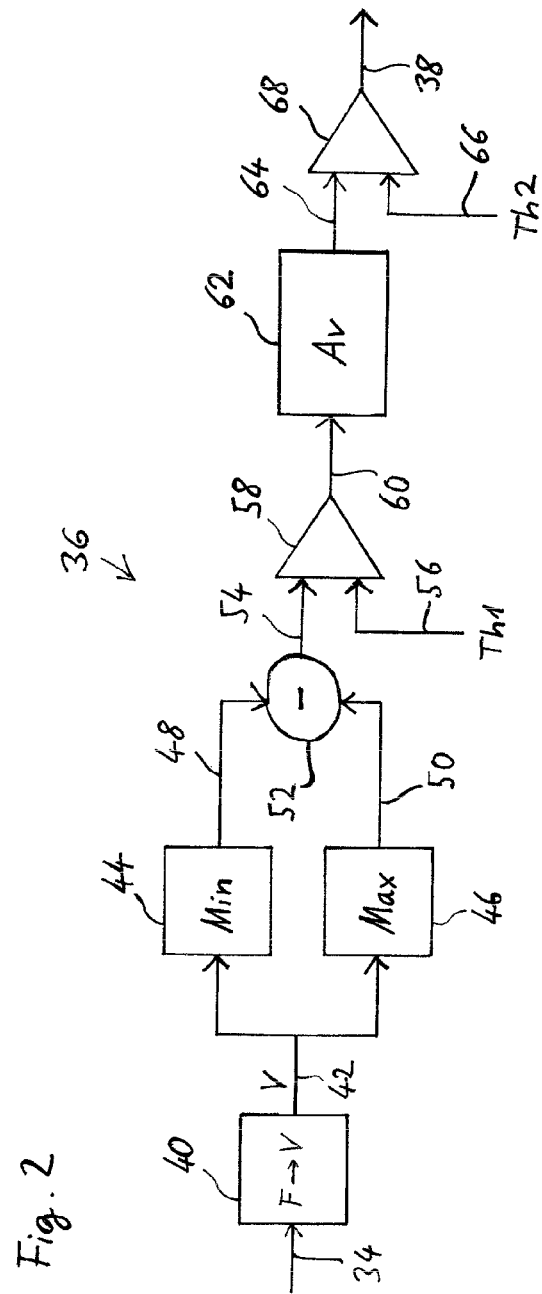
FIG. 2 schematically illustrates an example of an embodiment of a detection stage of the signal detector shown in FIG. 1.

An example of an embodiment of the detection stage 36 shown in FIG. 1 is schematically represented in FIG. 2. The detection stage 36 notably comprises a frequency discriminator 40 arranged to determine an instantaneous frequency 42 of the received signal 34, an evaluator 44, 46, 52, 58, 62 arranged to determine an amount of change 64 of the instantaneous frequency 42 during a test interval, and a comparator 68 arranged to determine whether the amount of change 64 is below a given threshold 66. The length of the test interval may for example be at least five times an oscillation period of the signal of interest. The signal of interest may be digitally modulated (using e.g. AM or FM), and the test interval may be shorter than the duration of one data bit in the signal of interest. Alternatively, the signal of interest may be modulated analogously (using e.g. AM or FM).

In the present exemplary embodiment, the amount of change 64 is derived from a difference 54 between a lower envelope 48 and an upper envelope 50 of the instantaneous frequency 42. In alternative embodiments the amount of change may for example be one of the following characteristics of the instantaneous frequency 42 during a test interval: the difference 54 between the lower envelope 48 and the upper envelope 50, a peak amplitude, a peak-to-peak amplitude, a variance, and a standard deviation. In the particular embodiment shown, the evaluator 44, 46, 52, 58, 62 comprises a first envelope detector 44 arranged to determine a lower envelope 48 of the instantaneous frequency 42, a second envelope detector 46 arranged to determine an upper envelope 50 of the instantaneous frequency 42, and a subtractor 52 arranged to determine a difference 54 between the lower envelope 48 and the upper envelope 50. Furthermore, the threshold 66 is a second threshold, the comparator 68 is a second comparator, and the evaluator further comprises a first comparator 58 arranged to determine whether the difference 54 is below a first threshold 56 and to generate a corresponding binary signal 60; and an averager 62 arranged to determine an average 64 of the binary signal 60 generated by the first comparator 58.

The detection stage 46 operates as follows. The received signal 34 is fed to the frequency discriminator 40. The frequency discriminator 40 determines an instantaneous oscillation frequency (instantaneous frequency) of the received signal 34. The frequency discriminator 40 may have high peak-to-peak noise in the presence of noise. The frequency discriminator 40 may for example be based on an XOR function. The frequency discriminator 40 may comprise a frequency-to-voltage converter which converts the instantaneous oscillation frequency of the received signal 34 into a corresponding voltage level. For the sake of brevity, no distinction is made in the following between the instantaneous frequency 42 and the voltage level representing the instantaneous frequency 42. The instantaneous frequency 42 delivered by the frequency discriminator 40 is input to the first envelope detector 44 and the second envelope detector 46. The first envelope detector 44 and the second envelope detector 46 determine a lower envelope 48 and an upper envelope 50 of the instantaneous frequency 42, respectively. In the case where the instantaneous frequency 42 is constant or varies only slowly, the current (instantaneous) lower and upper envelopes 48 and 50 will coincide or be nearly the same. On the contrary, in the case of a fluctuating instantaneous frequency 42, as will generally occur when the signal of interest is not contained in the received signal 34 or when the received signal 34 contains a lot of noise, the lower envelope 48 and the upper envelope 50 of the instantaneous frequency 42 will be separated by a gap corresponding to the variations of the instantaneous frequency 42. The lower and upper envelopes of the instantaneous frequency of the received signal being identical or nearly identical can therefore indicate the presence of the signal of interest. The current value of the lower envelope 48 and the current value of the upper envelope 50 are input to the subtractor 52 which outputs the difference between these two values, i.e. the instantaneous difference between the lower envelope and the upper envelope as determined by the envelope detectors 44, 46. The difference 54 and a first threshold 56 are input to the first comparator 58. The first comparator 58 compares the difference 54 and the first threshold 56. The comparator 58 outputs a binary signal 60 wherein a high voltage level indicates that the difference 54 was above the threshold 56 while a low output voltage indicates that the difference 54 was below the threshold 56. The binary signal 60 is fed to the averager 62 which outputs an average 64 of the binary signal 60. The average 64 is the average of the value of the binary signal 60 over the test interval. Depending on its design, the averager 62 may provide the average 64 continually or at a certain rate. For example, the averager 62 may update the average 64 periodically with a period that is equal to the length of the test interval. The average 64 and a second threshold 66 are fed to the second comparator 68 which compares the average 64 and the second threshold 66 and outputs the binary signal 38 to indicate whether or not the average 64 is above the second threshold 66. Thus, a low voltage at the output of the comparator 68 indicates that the signal of interest has been detected. The two thresholds 56 and 66 can be programmed to define a minimum signal-to-noise (SNR) level at which the detector 10 will indicate that the signal of interest has been detected. Thus the detector 10 can be easily adapted for different applications.

In an alternative embodiment (not shown), the evaluator comprises an averager arranged to determine an average of said difference over said test interval. In this alternative embodiment, the detection stage 36 shown in FIG. 2 may lack the comparator 58, and the difference 54 output by the subtractor 52 may be fed directly to the averager 62. In this case, the second threshold 66 may be chosen differently as compared to the embodiment described above with reference to FIG. 2.

Figure 3:
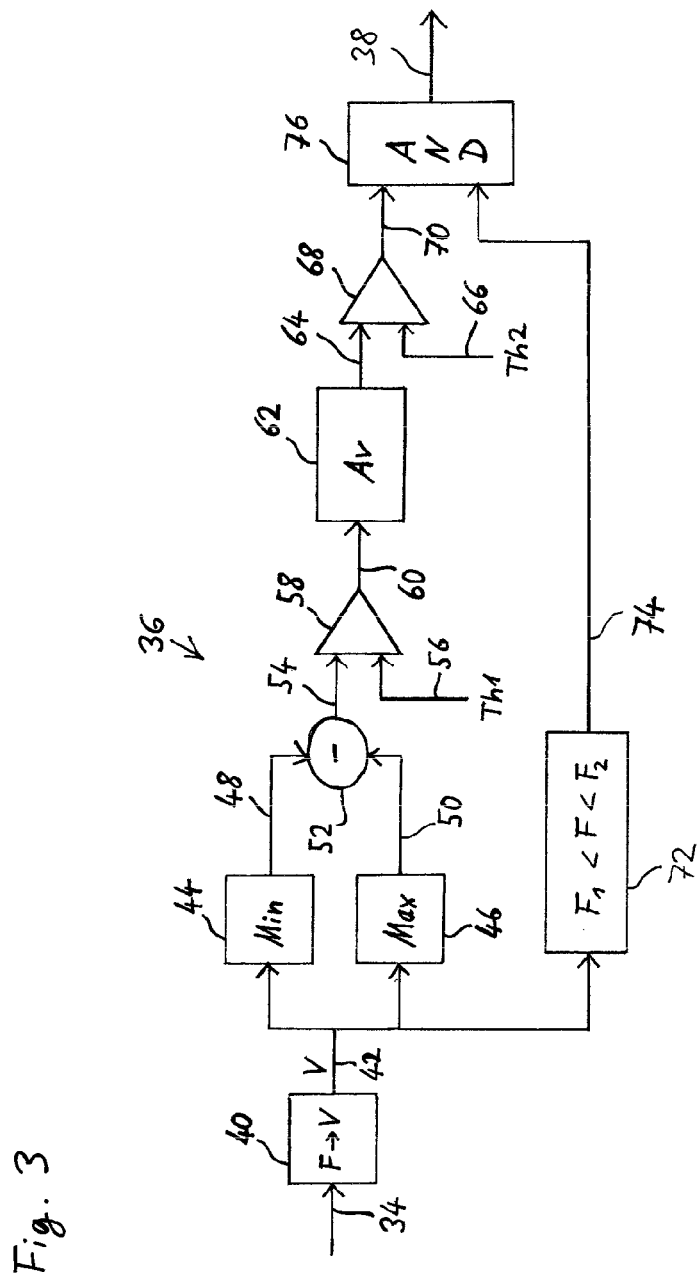
FIG. 3 schematically shows an example of another embodiment of a signal detector.

Referring now to FIG. 3, there is represented by way of example a further embodiment of the detection stage 36 shown in FIG. 1. Its basic outline is identical to the one shown in FIG. 2. The detection stage 36 additionally comprises a comparator 72 which is arranged so as to detect whether the instantaneous frequency 42 is within a given range. If the instantaneous frequency 42 is within the prescribed range, the comparator 72 outputs a logical TRUE; otherwise it outputs a logical FALSE. The binary signal 74 thus generated by the comparator 72, and the output signal 70 of the second comparator 68 are input to an AND gate 76, which outputs the detection signal 38. Thus an additional frequency check is performed. An advantage is that it may allow to relax the design constraints on the band-pass filter 28. More specifically, discriminating the instantaneous frequency 42 using the the additional comparator 72 may allow the band-pass filter 28 to have a wider bandwidth.

Figure 4:
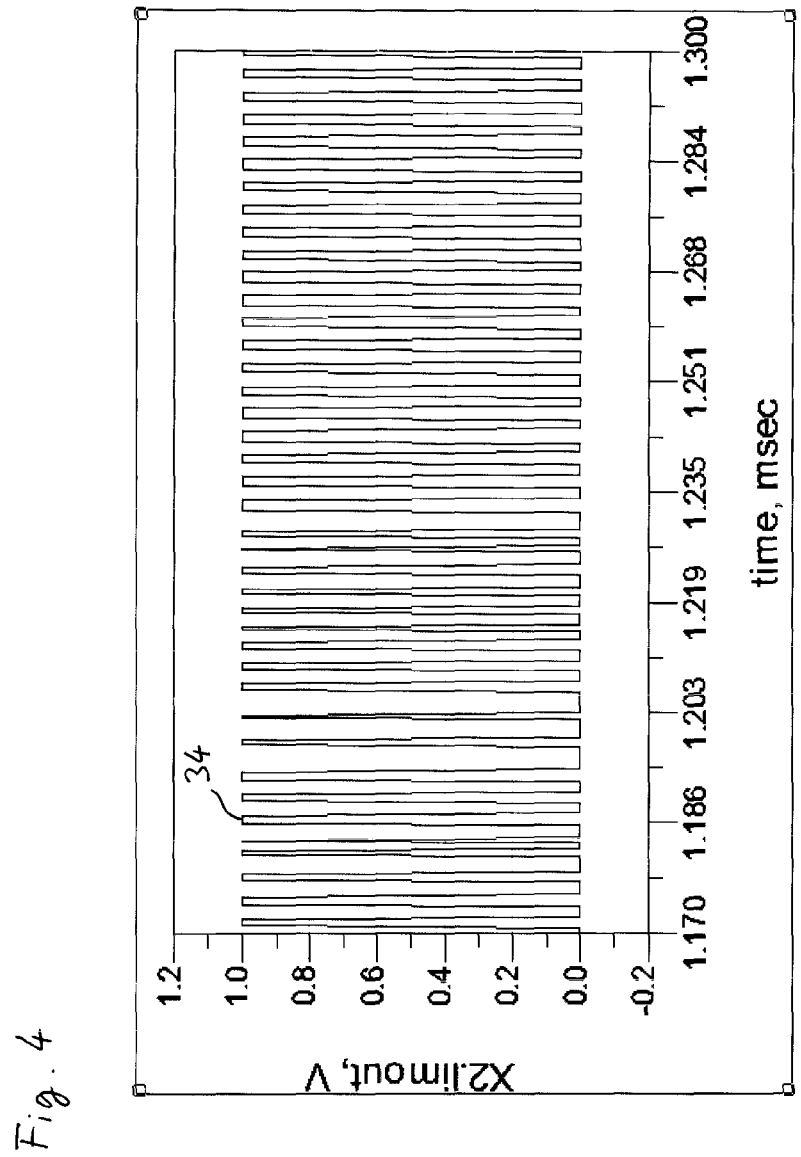
FIG. 4 shows a plot of a received radio frequency signal according to a simulation.

Referring now to FIG. 4, there is shown a plot of a received signal 34 which is fed to the detection stage 36 of FIG. 1, according to a simulation. The received signal 34 has an instantaneous frequency which varies irregularly for times less than 1.24 milliseconds due to a high signal-to-noise ratio. An incident radio frequency signal (the signal of interest) is received starting at 1.24 milliseconds. The signal of interest manifests itself in the received signal 34 by the instantaneous frequency becoming substantially constant for times greater than 1.24 milliseconds.

Figure 5:
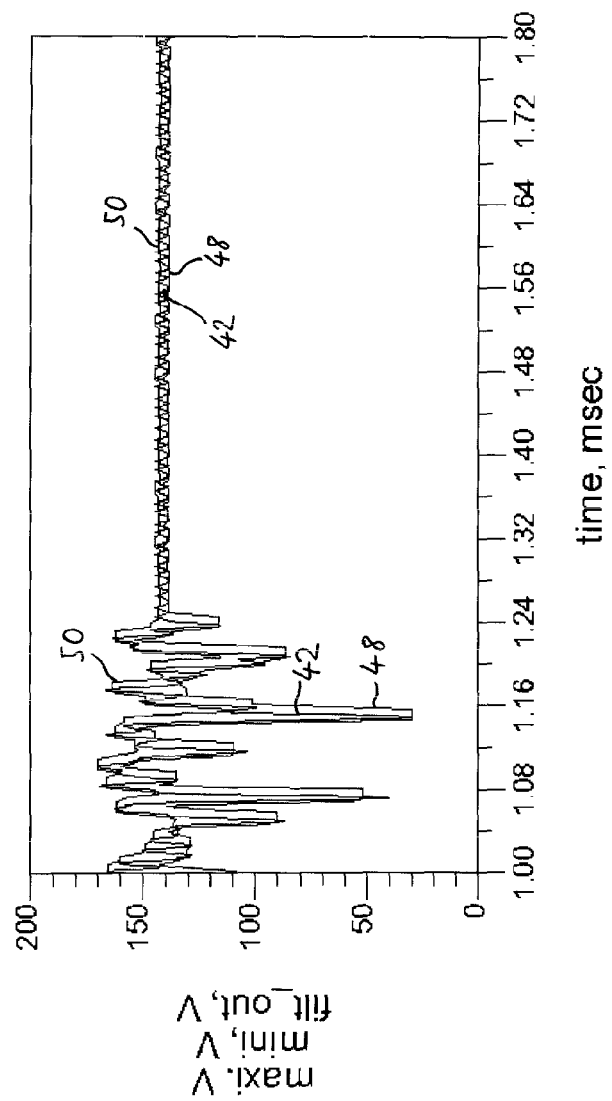
FIG. 5 shows plots of voltages representing an instantaneous frequency of an intermediate frequency signal, a lower envelope, and an upper envelope, respectively.

Plotted in FIG. 5 are the instantaneous frequency 42, its lower envelope 48 and its upper envelope 50 as obtained numerically from the simulation mentioned above with reference to FIG. 4. The instantaneous frequency 42 and with it its envelopes 48 and 50 fluctuate strongly for times less than 1.24 milliseconds. At times greater than 1.24 milliseconds the instantaneous frequency 42 remains nearly constant. Also the gap between the lower envelope 48 and the upper envelope 50 is greatly reduced for times greater than 1.24 milliseconds.

Figure 6:
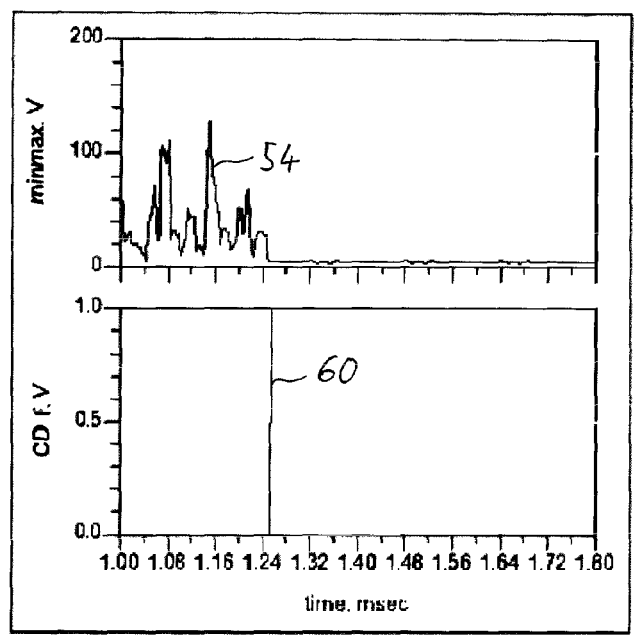
FIG. 6 shows a plot of the difference between the lower and the upper envelope shown in FIG. 5 and a detection signal generated on the basis of the difference between the upper and the lower envelope.

The gap (difference) 54 between the lower envelope 48 and the upper envelope 50 is plotted in FIG. 6 along with a corresponding comparator output signal 60, as functions of time. The plot of the difference 54 between the lower and the upper envelopes confirms that the difference 54 is small or large depending on whether or not the signal of interest is dominant in the received signal 34. At time 1.24 milliseconds the comparator signal 60 jumps from FALSE to TRUE (from LOW to HIGH). In an equivalent embodiment it might instead jump from HIGH to LOW, considering that HIGH and LOW are of course interchangeable.

Figure 7:
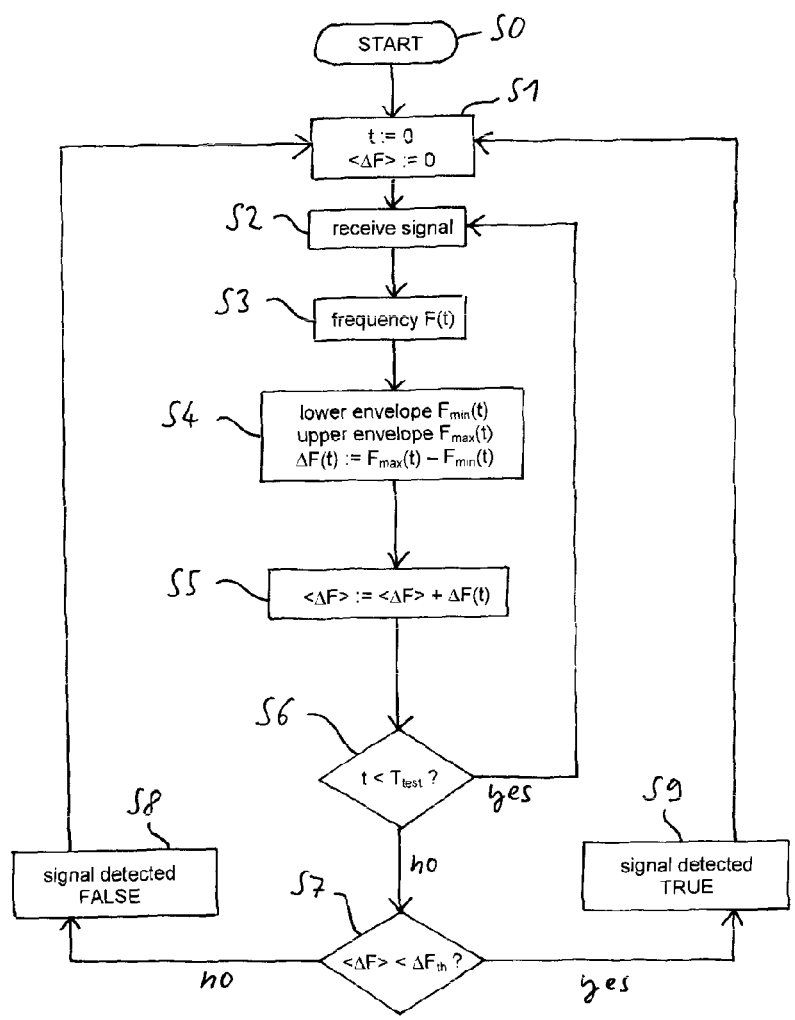
FIG. 7 shows a flow chart of an example of an embodiment of a method of detecting a signal of interest in a received signal.

Referring now to FIG. 7, there is illustrated by way of example a flow chart of a method of detecting a signal of interest in a received signal. The signal of interest is oscillatory at least during one or more time segments. The method comprises notably determining an instantaneous frequency of the received signal during a test interval (step S3), determining an amount of change of the instantaneous frequency during the test interval (steps S2, S3, S4, S5, S6), and determining whether the amount of change is below a given threshold (step S7).

The method starts in step S0. In subsequent step S1 the current physical time t is taken to be zero for the purpose of the present explanation, wherein it is understood that the time t naturally advances during the method. Furthermore, an average value $\Delta F$ is set to zero. In subsequent step S2 a signal, e.g. a broadband radio frequency signal, is received by e.g. an antenna. The received signal is further processed and fed to a frequency discriminator. The frequency discriminator determines an instantaneous frequency F(t) (step S3). In subsequent step S4, the difference $\Delta F$ between a lower envelope and an upper envelope of the instantaneous frequency is determined. An average, e.g. a mean value, of the difference between the lower and upper envelopes over a test interval of length $T_{test}$ is determined as represented by the loop comprising steps S2, S3, S4, S5, and S6. If the thus determined average is below a predefined threshold $\Delta F\_TH$ (step S7), a signal detect value is set to TRUE (step S9); otherwise the signal detect value is set to FALSE (step S8). In both cases the process then returns to step S1. A new average is then determined for a subsequent test interval of length $T_{test}$. In the embodiment shown, the average is thus an average over an interval [t0, t0+$T_{test}$] wherein t0 is a time that is updated at intervals of length $T_{test}$. This implementation may be advantageous notably if a data clock associated with the signal of interest is recovered so that the start of a received bit is known. Indeed the average then assumes a low value inside a bit time when the frequency is stable.

According to a variation (not shown) of the method illustrated in FIG. 7, the average is a sliding average, that is, an average of the difference ΔF over a test interval which is updated continually or quasi-continually (e.g. at time steps considerably shorter than $T_{test}$) by shifting the test interval continually or quasi-continually. Thus the sliding average is an average over a test interval $[t-T_{test}, t]$ where t is the current time (or the current time minus a short delay). An advantage of the sliding average is that it may allow detecting the signal of interest without clock recovery even if the one or more time segments on which the signal of interest is oscillatory are only slightly longer (possibly even slightly shorter) than the duration $T_{test}$ of the test interval.

Figure 8:
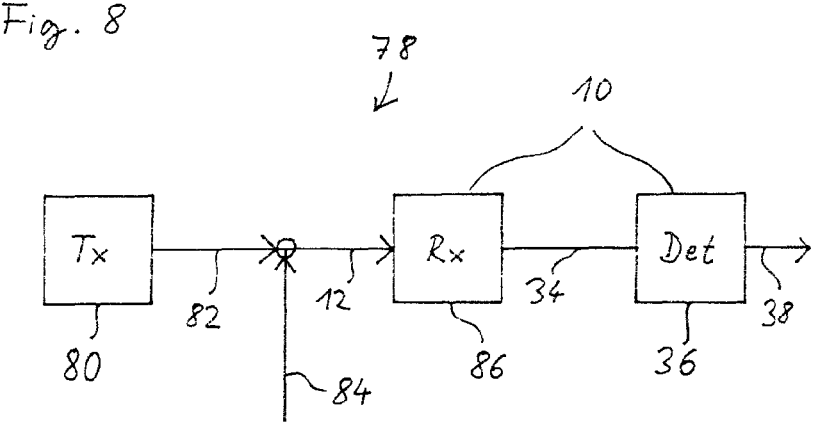
FIG. 8 shows an example of an embodiment of a signal transmission system.

FIG. 8 illustrates, by way of example, a signal transmission system 78. The signal transmission system 78 may for example be a wireless communication system, e.g. a Wireless Personal Area Network (WPAN), a Wireless Local Access Network (WLAN) or a cellular telephone system, or it may be a subsystem of such a communication system. The term "communication system" is to be understood in a broad sense. It may include both unidirectional and bidirectional communication systems. The signal transmission system 78 comprises a signal generator 80 which generates a signal of interest 82, and a signal detector 10 which detects the signal of interest 82 in a received signal 12. The signal of interest 82 is oscillatory at least during one or more time segments. The signal detector 10 comprises a frequency discriminator arranged to determine an instantaneous frequency of the received signal 12, an evaluator arranged to determine an amount of change of the instantaneous frequency during a test interval; and a comparator arranged to determine whether the amount of change is below a given threshold. Exemplary embodiments of the signal detector 10 have been described above with reference to FIGS. 2 to 6. The length of the test interval may for example be at least five times (or at least ten times or at least twenty times) an oscillation period of the signal of interest. The signal of interest 82 may have a carrier frequency which is substantially constant during the one or more time segments. The signal of interest 82 may digitally modulated. In this case the test interval may be shorter than the duration of one data bit in the signal of interest 82. In the specific embodiment shown, the signal generator 80 is a transmitter 80 which emits the signal of interest 82 in the form of an electromagnetic wave 82 via a transmission antenna (not shown). Background noise 84 (e.g. so-called electric smog) is inadvertently added to the signal of interest 82. The resulting electromagnetic wave is captured by a reception antenna (not shown) which generates the received signal 12 in response to the incident electromagnetic wave. The received signal 12 is fed to a receiver 86 which processes the received signal 12 to generate a processed (e.g. down-converted and/or filtered) received signal 34. The receiver 86 may for example comprise a RF front-end stage as described above with reference to FIG. 1. The processed received signal 34 is fed to a detection stage 36.

In summary, the proposed signal detector and the proposed method allow detecting a carrier signal or other oscillatory signal in a noisy environment in a fast and robust way. The invention may allow a further reduction in standby power consumption of receivers. The signal detector is responsive to a low signal-to-noise ratio rather than to a high signal strength. Thus the signal detector may also be applied to noisy receivers and to receivers having an RF front-end gain that is imperfectly known, e.g. due to process spread. The proposed signal detector can be arranged to be very fast because the detection can be done in less than a bit time. The signal detector can also be arranged to be very accurate, notably in comparison to an RSSI measurement, because the detection is independent, at least in principal, of the gains of the various receiver stages that are typically employed to pre-process the signal.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system. The computer program may be provided on a data carrier, such as a CD-ROM or diskette, stored with data loadable in a memory of a computer system, the data representing the computer program. The data carrier may further be a data connection, such as a telephone cable or a wireless connection.

In the foregoing specification, the invention has been described with reference to specific examples of embodiments of the invention. It will, however, be evident that various modifications and changes may be made therein without departing from the broader spirit and scope of the invention as set forth in the appended claims. For example, the connections may be an type of connection suitable to transfer signals from or to the respective nodes, units or devices, for example via intermediate devices. Accordingly, unless implied or stated otherwise the connections may for example be direct connections or indirect connections.

The terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Each signal described herein may be designed as positive or negative logic, where negative logic can be indicated by a bar over the signal name or an asterisk (*) following the name. In the case of a negative logic signal, the signal is active low where the logically true state corresponds to a logic level zero. In the case of a positive logic signal, the signal is active high where the logically true state corresponds to a logic level one. Note that any of the signals described herein can be designed as either negative or positive logic signals. Therefore, in alternate embodiments, those signals described as positive logic signals may be implemented as negative logic signals, and those signals described as negative logic signals may be implemented as positive logic signals.

Because the apparatus implementing the present invention is, for the most part, composed of electronic components and circuits known to those skilled in the art, circuit details will not be explained in any greater extent than that considered necessary as illustrated above, for the understanding and appreciation of the underlying concepts of the present invention and in order not to obfuscate or distract from the teachings of the present invention.

Although the invention has been described with respect to specific conductivity types or polarity of potentials, skilled artisans appreciated that conductivity types and polarities of potentials may be reversed.

The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Some of the above embodiments, as applicable, may be implemented using a variety of different information processing systems. For example, although FIG. 1 and the discussion thereof describe an exemplary information processing architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between logic blocks are merely illustrative and that alternative embodiments may merge logic blocks or circuit elements or impose an alternate decomposition of functionality upon various logic blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Also for example, in one embodiment, the illustrated elements of system 10 are circuitry located on a single integrated circuit or within a same device. Alternatively, system 10 may include any number of separate integrated circuits or separate devices interconnected with each other. For example, the detection stage 36 may be located on a same integrated circuit as the low-noise amplifier 14 or on a separate integrated circuit or located within another peripheral or slave discretely separate from other elements of system 10. Also for example, system 10 or portions thereof may be soft or code representations of physical circuitry or of logical representations convertible into physical circuitry. As such, system 10 may be embodied in a hardware description language of any appropriate type.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

In one embodiment, system 10 is a computer system such as a personal computer system. Other embodiments may include different types of computer systems. Computer systems are information handling systems which can be designed to give independent computing power to one or more users. Computer systems may be found in many forms including but not limited to mainframes, minicomputers, servers, workstations, personal computers, notepads, personal digital assistants, electronic games, automotive and other embedded systems, cell phones and various other wireless devices. A typical computer system includes at least one processing unit, associated memory and a number of input/output (I/O) devices.

A computer system processes information according to a program and produces resultant output information via I/O devices. A program is a list of instructions such as a particular application program and/or an operating system. A computer program is typically stored internally on computer readable storage medium or transmitted to the computer system via a computer readable transmission medium. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device. For example, the detection stage 36 may be physically distributed over a plurality of electronic components.

Also, devices functionally forming separate devices may be integrated in a single physical device. For example, the components of the detection stage 36 shown in FIG. 2 may be implemented as a single integrated circuit.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements The mere fact that certain measures are recited in mutually different claims does not indicate that a combination of these measures cannot be used to advantage.

The invention claimed is:

1. A signal detector for detecting a signal of interest in a received signal, wherein the signal of interest is oscillatory at least during one or more time segments and the signal detector comprises:

a frequency discriminator arranged to determine an instantaneous frequency of the received signal;

an evaluator arranged to determine an amount of change of the instantaneous frequency during a test interval; and a comparator arranged to determine whether the amount of change is below a given threshold, wherein the evaluator further comprises:
- a first envelope detector arranged to determine a lower envelope of the instantaneous frequency;
- a second envelope detector arranged to determine an upper envelope of the instantaneous frequency and
- a sub-tractor arranged to determine a difference be the lower envelope and the upper envelope.

2. The signal detector as set forth in claim 1, wherein the amount of change is one of the following characteristics of the instantaneous frequency during the test interval or a characteristic derived therefrom:
- a difference between a lower envelope and an upper envelope;
- a peak amplitude;
- a peak-to-peak amplitude;
- a variance; and
- a standard deviation.

3. The signal detector as set forth in claim 1, wherein the evaluator further comprises an averager arranged to determine an average of said difference over said test interval.

4. The signal detector as set forth in claim 1, wherein the threshold is a second threshold, the comparator is a second comparator, and the evaluator further comprises
- a first comparator arranged to determine whether the difference is below a first threshold and generating a corresponding binary signal; and
- an averager arranged to determine an average of the binary signal generated by the first comparator.

5. The signal detector as set forth in claim 1, further comprising
- a mixer arranged to up-convert or down-convert the received signal prior to determining the instantaneous frequency; and
- a band-pass filter arranged to filter the received signal prior to determining the instantaneous frequency.

6. The signal detector as set forth in claim 1, wherein the frequency discriminator comprises a frequency-to-voltage converter.

7. The signal detector as set forth in claim 1, comprising a further comparator arranged to detect whether the instantaneous frequency is within a given range.

8. The signal detector of claim 1, wherein the signal detector is included in at least:
- one of the following: an integrated circuit, an electronic device, an optoelectronic device, a wireless communication device, a short range device, a mobile phone, a radio receiver, a radio controlled device, a radio controlled clock, and a sound detector.

9. The detector as set forth in claim 8, comprising a component arranged to be energized in response to the signal detector detecting the signal of interest.

10. A signal transmission system comprising a signal generator for generating a signal of interest and a signal detector for detecting the signal of interest in a received signal, wherein the signal of interest is oscillatory at least during one or more time segments and the signal detector comprises:
- a frequency discriminator arranged to determine an instantaneous frequency of the received signal;

an evaluator arranged to determine an amount of change of the instantaneous frequency during a test interval; and a comparator arranged to determine whether the amount of change is below a given threshold, wherein the evaluator further comprises:
- a first envelope detector arranged to determine a lower envelope of the instantaneous frequency;
- a second envelope detector arranged to determine an upper envelope of the instantaneous frequency; and
- a subtractor arranged to determine a difference between the lower envelope and the upper envelope.

11. The signal transmission system as set forth in claim 10, wherein the length of the test interval is at least five times an oscillation period of the signal of interest.

12. The signal transmission system as set forth in claim 10 wherein the signal of interest has a carrier frequency which is substantially constant during the one or more time segments.

13. The signal transmission system as set forth in any one of claim 10, wherein the signal of interest is digitally modulated and the test interval is shorter than the duration of one data bit in the signal of interest.

14. A method of detecting a signal of interest in a received signal, wherein the signal of interest is oscillatory at least during one or more time segments and the method comprises:
- determining an instantaneous frequency of the received signal during a test interval;
- determining an amount of change of the instantaneous frequency during the test interval;
- determining whether the amount of change is below a given threshold;
- determining, at a first envelope detector, a lower envelope of the instantaneous frequency;
- determining, a second envelope detector, an upper envelope of the instantaneous frequency; and
- determining, at a subtractor, a difference between the lower envelope and the upper envelope.

15. The method transmission system as set forth in claim 14, wherein the length of the test interval is at least five times an oscillation period of the signal of interest.

16. The method transmission system as set forth in claim 14, wherein the signal of interest has a carrier frequency which is substantially constant during the one or more time segments.

17. The method transmission system as set forth in claim 14, wherein the signal of interest is digitally modulated and the test interval is shorter than the duration of one data bit in the signal of interest.

18. The signal transmission system of claim 10, wherein the evaluator further comprises an averager to determine an average of said difference over said test interval.

19. The signal transmission system of claim 10, wherein the threshold is a second threshold, the comparator is a second comparator, and the evaluator further comprises:
- a first comparator to determine whether the difference is below a first threshold and generating a corresponding binary signal; and
- an averager to determine an average of the binary signal generated by the first comparator.

20. The method of claim 14, further comprising:
- determining, at an averager, an average of said difference over said test interval.

* * * * *